United States Patent
Knutsson et al.

(10) Patent No.: US 9,883,086 B2
(45) Date of Patent: Jan. 30, 2018

(54) CAMERA MODULE FOR A MOTOR VEHICLE AND METHOD OF PRE-FOCUSING A LENS OBJECTIVE IN A LENS HOLDER

(71) Applicant: Autoliv Development AB, Vågårda (SE)

(72) Inventors: Per Knutsson, Linköping (SE); Peter Fredriksson, Linköping (SE); Bo Malmborg, Askersund (SE); Mikael Johansson, Motala (SE); Melih Gunes, Wixom, MI (US)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/704,194

(22) Filed: May 5, 2015

(65) Prior Publication Data
US 2015/0326765 A1 Nov. 12, 2015

(30) Foreign Application Priority Data
May 7, 2014 (EP) .................................... 14167378

(51) Int. Cl.
H04N 5/232 (2006.01)
H04N 5/225 (2006.01)
B60R 11/04 (2006.01)
G02B 7/02 (2006.01)

(52) U.S. Cl.
CPC ........... *H04N 5/2253* (2013.01); *B60R 11/04* (2013.01); *G02B 7/028* (2013.01); *H04N 5/2254* (2013.01); *H04N 5/2257* (2013.01)

(58) Field of Classification Search
CPC .. H04N 5/2253; H04N 5/2254; H04N 5/2257; G02B 7/028
See application file for complete search history.

(56) References Cited

U.S. PATENT DOCUMENTS

| 7,113,351 B2 * | 9/2006 | Hovanky ............... G02B 7/102 359/696 |
| 8,786,713 B1 * | 7/2014 | Tamasanis ........... H04N 5/2254 348/190 |
| 2004/0165095 A1 * | 8/2004 | Shimizu ................... G02B 3/04 348/335 |
| 2005/0242274 A1 * | 11/2005 | Webster .................... G02B 7/02 250/239 |

(Continued)

FOREIGN PATENT DOCUMENTS

| DE | 10261973 A1 | 1/2004 |
| DE | 102008047277 A1 | 4/2010 |

(Continued)

OTHER PUBLICATIONS

EP 1 351 316 B1 English Translation Provided.*
Extended European Search Report dated Jan. 14, 2015.

*Primary Examiner* — Lin Ye
*Assistant Examiner* — John H Morehead, III
(74) *Attorney, Agent, or Firm* — Brinks Gilson & Lione

(57) ABSTRACT

A camera module for a motor vehicle having a lens objective, a lens holder holding said lens objective, and a back plate connected to said lens holder and holding an image sensor in or close to an image plane of the lens objective. The materials, shapes and/or relative positions of the components of the lens objective are designed to keep the image plane in or close to the sensitive plane of the image sensor over an operating temperature range of the camera module.

18 Claims, 3 Drawing Sheets

(56) References Cited

U.S. PATENT DOCUMENTS

| | | | |
|---|---|---|---|
| 2007/0091477 A1* | 4/2007 | Iwai | G02B 7/021 359/823 |
| 2009/0010638 A1* | 1/2009 | Chao | G02B 7/02 396/448 |
| 2010/0002317 A1* | 1/2010 | Osaka | G02B 7/08 359/824 |
| 2010/0247086 A1* | 9/2010 | Tallaron | G02B 3/14 396/133 |
| 2010/0259648 A1* | 10/2010 | Iijima | G01C 3/085 348/241 |
| 2011/0037886 A1* | 2/2011 | Singh | G02B 13/0085 348/340 |
| 2011/0234890 A1* | 9/2011 | Kobayashi | H04N 5/2251 348/373 |
| 2012/0019905 A1* | 1/2012 | Teraoka | G02B 7/021 359/356 |
| 2013/0221195 A1* | 8/2013 | Kennedy | H01L 27/14618 250/208.1 |
| 2013/0258181 A1* | 10/2013 | Leung | H04N 5/2251 348/374 |
| 2014/0036084 A1* | 2/2014 | Lu | H04N 5/2254 348/148 |
| 2014/0160284 A1* | 6/2014 | Achenbach | H04N 5/2251 348/143 |
| 2014/0211009 A1* | 7/2014 | Fursich | G02B 13/04 348/148 |
| 2014/0307099 A1* | 10/2014 | Yeon | H04N 5/2257 348/164 |

FOREIGN PATENT DOCUMENTS

| | | | |
|---|---|---|---|
| EP | 1 351 316 B1 * | 3/2003 | H01L 31/0203 |
| EP | 1 353 316 B1 * | 3/2003 | H01L 31/0203 |
| EP | 1351316 B1 | 1/2012 | |

\* cited by examiner

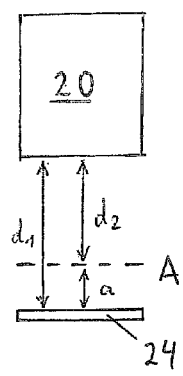
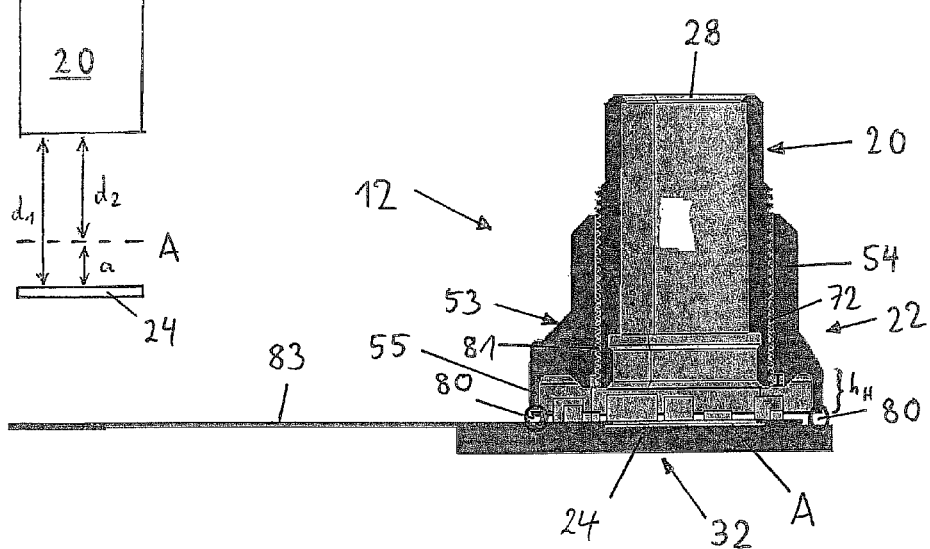
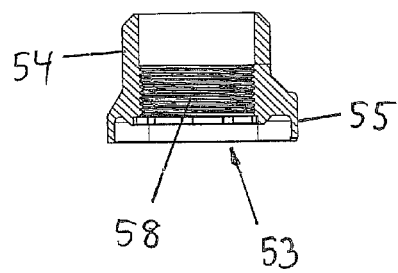
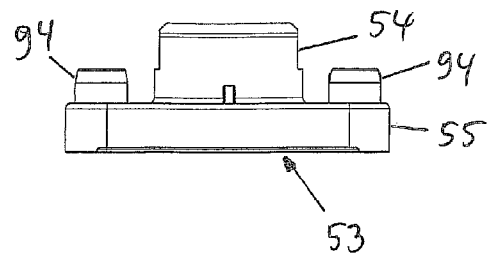

CAMERA MODULE FOR A MOTOR VEHICLE AND METHOD OF PRE-FOCUSING A LENS OBJECTIVE IN A LENS HOLDER

CROSS REFERENCE TO RELATED APPLICATIONS

This application claims priority to European Patent Application EP1416 7378.0 filed May 7, 2014.

BACKGROUND

1. Field of the Invention

The present invention generally relates to a camera module for a motor vehicle, comprising a lens objective, a lens holder holding said lens objective, and a back plate connected to said lens holder and holding an image sensor in or close to an image plane of the lens objective. The invention also relates to a method of pre-focusing a lens objective in a lens holder.

2. Description of Related Art

Automotive camera modules are exposed to temperatures varying over a large range, and are required to have excellent imaging performance over the whole temperature range occurring in practice. In many fixed-focus automotive camera modules, a major challenge is to retain the focus over the temperature envelope T. For low f/# lenses, the distance between the image and the sensor must be controlled at a scale of micrometers. However, the lens holder expands with increasing temperature, and therefore the distance between the lens objective and the image sensor increases along the optical axis with increasing temperature, with the result that the sensor moves out of the image plane of the lens objective and the image quality deteriorates.

DE 10 2008 047 277 A1 discloses a camera module where a compensating tube is provided between a lens carrier and a lens barrel. The compensating body may have an inner thread into which the lens barrel may be screwed.

DE 102 61 973 A1 discloses a camera module where the lens is indirectly held by a housing tube via a frusto-conical lens holding element which has a significantly smaller thermal expansion coefficient than the housing tube.

The camera modules of DE 10 2008 047 277 A1 and DE 102 61 973 A1 provide for a compensation of the thermal expansion of the lens holder through a compensating element which, however, constitutes an additional part and makes the mounting of the camera module more laborious.

SUMMARY

The problem underlying the present invention is to provide a simple camera module which can be easily mounted and achieves highly precise focus stability over temperature.

The invention solves this object with the features of the independent claims. According to the invention, the lens objective, in particular the materials, shapes and/or relative positions of the components of the lens objective, is designed to increase the distance between the image plane and the lens objective with increasing temperature over an operating temperature range of the camera module. Since the lens holder expands with increasing temperature in a direction of an optical axis defined by the lens objective, and therefore the distance between the lens objective and the image sensor increases with increasing temperature, the lens objective is designed such that the distance between the lens objective and the image plane also increases with increasing temperature. In this manner, according to the invention, the thermal expansion of the lens holder with increasing temperature, and thus the moving of the image plane out of the sensitive plane of the image sensor and a corresponding deterioration of the image quality, can be counteracted.

Preferably, the lens objective is designed to keep the image plane in or close to the sensitive plane of the image sensor over an operating temperature range of the camera module. In other words, the change of the back focal length, i.e. the distance between the lens objective and its image plane, over temperature is preferably balanced by the thermal expansion of the lens holder. As a result, the image sensor can detect clear images over a wide temperature range occurring in motor vehicle applications. More specifically, the distance between the lens objective and the image plane, which will vary over temperature due to mechanical displacements in the lens objective, changes in the refractive index of the optical elements or lenses in the lens objective, dimensional changes within the lens objective, etc., is designed to compensate for the distance between the lens objective and the image sensor over temperature.

Preferably the lens objective is designed such that $\Delta d_2 / \Delta T = h_H \cdot C_H$, wherein $\Delta d_2 / \Delta T$ is the change of the distance $d_2$ between the lens objective and the image plane with temperature caused by changes of and within the lens objective, and $C_H$ and $h_H$ are the thermal expansion coefficient and the free height of the lens holder, respectively. The height $h_H$ means the length in the direction of the optical axis as defined by the lens objective. Furthermore, the height of the lens holder $h_H$ is the effective or free height of the lens holder, i.e. the part of the lens holder between the connections to the back plate and the lens objective which can freely move.

The invention can advantageously be achieved by using a plurality of lenses being made of different materials, in particular glass and plastics, and/or convex and concave lenses.

Preferably a lens barrel and/or lens spacers of the lens objective are made of metal, preferably of brass. Metal, in particular brass, as base material for the lens objective has preferred temperature-change sensitivity properties. This allows improving the insensitivity of the camera unit to temperature changes.

An aspect of the invention relates to an active pre-focusing procedure which is advantageously performed by the lens objective manufacturer using a pre-mounting image sensor. The pre-focusing procedure advantageously comprises the steps of providing the lens objective, the lens holder and a pre-mounting image sensor, applying glue to the lens objective and/or to the lens holder, positioning the lens objective and the back plate relative to each other and positioning the pre-mounting image sensor in a set distance to the lens holder, taking reference images, moving the lens objective relative to the lens holder along the optical axis until the image quality determined by the pre-mounting image sensor becomes optimal, and hardening the glue while holding the lens objective and the lens holder in the optimal relative position. With the pre-mounting procedure, a desired set distance between the lens objective and the image plane can be realized with high precision already at the manufacturer of the lens objective. Undesired large corrections of the distance between the lens objective and the image sensor during the final mounting of the camera module are not required. The pre-focusing procedure leads to advantageously minimize the spread of the glue joint thickness.

In an alternative method of mounting the lens objective into the lens holder, a stop element is provided between the lens objective and the lens holder, wherein the lens objective and the lens holder are moved relative to each other along the optical z-axis until the stop elements terminates the movement, and then the glue is hardened.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 2 shows a cross-sectional view of a camera module;
FIG. 3 shows a schematic illustration of some optical parameters of the camera module;
FIG. 4 shows a cross-sectional view of a lens holder;
FIG. 5 shows a side view of a lens holder.

DETAILED DESCRIPTION

Figure 1:
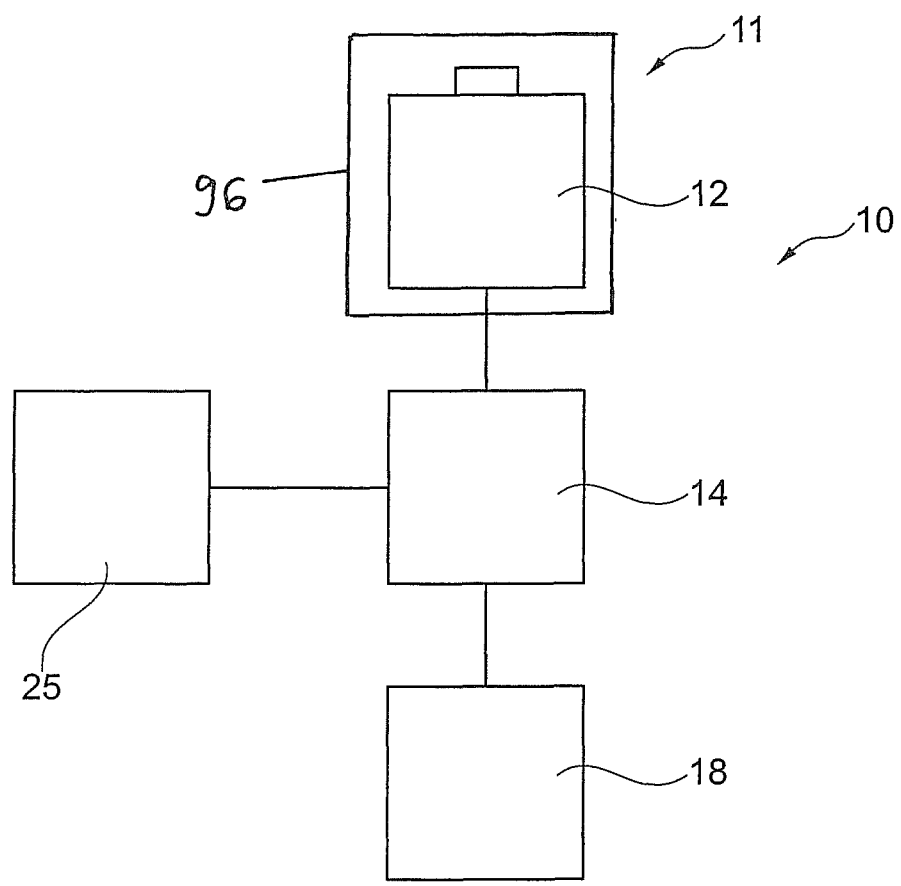
FIG. 1 shows a scheme illustrating a vision system.

The vision system 10 is mounted in a motor vehicle and comprises an imaging means 11 for acquiring images of a region surrounding the motor vehicle, for example a region in front of the motor vehicle. Preferably the imaging means 11 comprises one or more optical imaging devices 12, in particular camera modules, in particular operating in the visible wavelength range. However, infrared cameras may also be possible, where infrared covers near IR with wavelengths below 5 microns and/or far IR with wavelengths beyond 5 microns. In some embodiments the imaging means 11 comprises a plurality imaging devices 12 in particular forming a stereo imaging means 11. In other embodiments only one imaging device 12 forming a mono imaging means 11 can be used. Each camera module 12 has one optical path; therefore it can also be called a camera eye.

The imaging means 11 may be coupled to an image pre-processor not shown in FIG. 1 adapted to control the capture of images by the imaging means 11, receive the electrical signal containing the image information from the imaging means 11, warp pairs of left/right images into alignment and/or create disparity images, which per se is known in the art. The image pre-processor may be realized by a dedicated hardware circuit, in particular a Field Programmable Gate Array (FPGA). Alternatively the pre-processor, or part of its functions, can be realized in the electronic processing means 14. In case of a mono imaging means 11 using only one camera 12 a pre-processor is not needed.

The image data are provided to an electronic processing means 14 where further image and data processing is carried out by corresponding software. In particular, the image and data processing in the processing means 14 comprises the following functions: identification and classification of possible objects surrounding the motor vehicle, such as pedestrians, other vehicles, bicyclists or large animals; tracking over time the position of identified object candidates in the recorded images; estimation of a collision probability between the vehicle and a detected object; and/or activation or control of at least one driver assistance means 18 depending on the result of said collision probability estimation. The driver assistance means 18 may in particular comprise a display means for displaying information relating to a detected object. However, the invention is not limited to a display means. The driver assistance means 18 may in addition or alternatively comprise a warning means adapted to provide a collision warning to the driver by suitable optical, acoustical and/or haptical warning signals; one or more restraint systems such as occupant airbags or safety belt tensioners, pedestrian airbags, hood lifters and the like; and/or dynamic vehicle control systems such as brakes or steering means. The processing means 14 expediently has access to a memory means 25.

The electronic processing means 14 is preferably programmed or programmable and expediently comprises a microprocessor or micro-controller. The electronic processing means 14 can preferably be realized in a digital signal processor (DSP). The electronic processing means 14 and the memory means 25 are preferably realised in an on-board electronic control unit (ECU) and may be connected to the imaging means 11 via a separate cable or a vehicle data bus. In other embodiments the ECU and one or more of the imaging devices 12 can be integrated into a single unit, where a one box solution including the ECU and all imaging devices 12 can be preferred. All steps from imaging, image processing to activation or control of driver assistance means 18 are performed automatically and continuously during driving in real time.

In a preferred embodiment shown in FIGS. 2 to 6 the camera module 12 comprises a lens objective 20, a lens holder 53 holding the lens objective 20, an image sensor 24 and a back plate 32 holding the image sensor 24. The lens holder 53 is connected to the back plate 32 by means of a glue joint 80 which may be ring-shaped or composed of a plurality of glue dots. The glue 80 preferably is UV curable glue. The lens holder 53, the back plate 32 and the glue joint 80 form a housing 22 which, together with the lens objective 20, is basically closed in a light tight manner except for an incident light opening 28. With respect to thermal stability, the lens holder 53 is preferably made of metal, for example Zink alloy.

The lens holder 53 comprises a tubular part 54 which is preferably cylindrical and extends parallel to the optical axis of the lens objective 20, and a base part 55 to connect the lens holder 53 to the back plate 32 by the glue joint 80. The tubular part 54 of the lens holder 53 and the lens objective 20 are arranged concentrically to the optical axis of the lens objective 20. The lens holder 53 preferably comprises external features 94 or position defining means (see FIG. 5), which may be provided on the upper side of the base part 55 of the lens holder 53, through which the camera module 12 can be fastened with fixed orientation to an external camera housing part 96 of the imaging means 11.

The lens objective 20 is coaxially held in the tubular part 54 of the lens holder 53 and connected to it via a screw connection. More specifically, the lens holder 53 comprises an inner thread 58 preferably extending over a lower region of its tubular part 54 (see FIG. 4) and the lens objective 20 comprises a corresponding outer thread 72 adapted to engage the thread 58 of the lens holder 53 and preferably extending over the full length of the tubular part 54. The lens objective 20 can therefore be screwed into the lens holder 53. The axial length over which the threads 58, 72 engage when the camera module 12 is mounted is preferably significantly smaller than the length of the lens objective 20 along the optical axis, in particular smaller than half of the length of the lens objective 20.

The connection between the lens objective 20 and the lens holder 54 is fixed by glue 81 preferably applied between the threads 58, 72 over a glue height $h_G$ corresponding for example to the axial length of the thread 58. The glue 81 is provided in the lower region of the lens holder 53, in particular in the lower half of the tubular part 54. As shown in FIG. 2, the lens objective 20 preferably projects beyond the top end of the lens holder 53 which ensures a compact design of the camera module 12.

Incident light from an object surrounding the motor vehicle falls through the opening 28 and is focused by the lens objective 20 in the image plane A of the lens objective 20. The lens objective 20 and the sensitive plane A of the image sensor 24 are arranged apart from each other with a predetermined distance $d_1$ (see FIG. 3), which ideally corresponds to the back focal distance of the lens objective 20 such that the image focus lies in the sensitive plane of the image sensor 24. The image sensor 24 is preferably a two-dimensional image sensor, in particular an optical sensor having maximum sensitivity in the visible wavelength region, and is adapted to convert incident light into an electrical signal containing image information of the object to be detected. The image sensor 24 may for example be a CCD sensor or a CMOS sensor.

The rigid back plate 32 is preferably made of metal, in particular steel. The printed circuit board 83 is preferably a flexible printed circuit board arranged on the sensor side of the back plate 32. The lens holder 53 is directly attached to the back plate 32 in the region of blank areas not covered by the printed circuit board 83.

The temperature dependent distance a(T) between the image and the image sensor 24 is determined by two parameters, see FIG. 3. The first parameter is the temperature dependent distance $d_1(T)$ between the lens objective 20 and the image sensor 24. On top of this, the distance $d_2(T)$ between the lens objective 20 and the image plane A will vary over temperature due to mechanical displacements in the lens objective 20, change in refractive index of the optical elements or lenses in the lens objective 20, dimensional changes within the lens objective 20, etc. The image position A relative to the image sensor 24 is then given by $a(T)=d_1(T)-d_2(T)$.

Ideally, the image shall always be placed in the sensitive plane of the sensor 24, i.e. $a(T)=0$, such that $d_1(T)=d_2(T)$.

In order to achieve this, the lens objective 20 is designed such that $d_2(T)$ increases with increasing temperature T, i.e. $\Delta d_2/\Delta T$ is positive. With increasing temperature, the tubular part 54 of the lens holder 53 expands, i.e. the height $h_H(T)$ of the lens holder 53 along the optical axis increases, and therefore, $d_1(T)$ increases as well. With $\Delta d_2/\Delta T$ being positive, the increase of $d_1(T)$ can be counteracted. This acts toward maintaining the image plane A in the sensitive plane of the image sensor 24. Ideally, the lens objective 20 is designed such that $d_2(T)$ fulfils the equation $h_H \cdot C_H = \Delta d_2/\Delta T$, where $C_H$ represents the thermal expansion coefficient of the lens holder 53. The thermal expansion coefficient $C_H$ is defined as a linear thermal expansion coefficient by $\Delta h_H = h \cdot C_H \cdot \Delta T$. Furthermore, the height $h_H$ of the lens holder 53 is understood to mean the free height of the lens holder 53, i.e. the part of the lens holder 53 between the connection to the back plate 32 and to the lens objective 20 which can freely move. The free or effective length $h_H$ of the lens holder 53 can be significantly smaller than the actual length of the lens holder 53. In particular, by providing the glue 81 in the lower region of the lens holder 53, in particular in the lower half of the tubular part 54, the effective length $h_H$ of the lens holder 53 can be made small, which makes the temperature compensation through careful design of $d_2(T)$ much easier.

Figure 6:
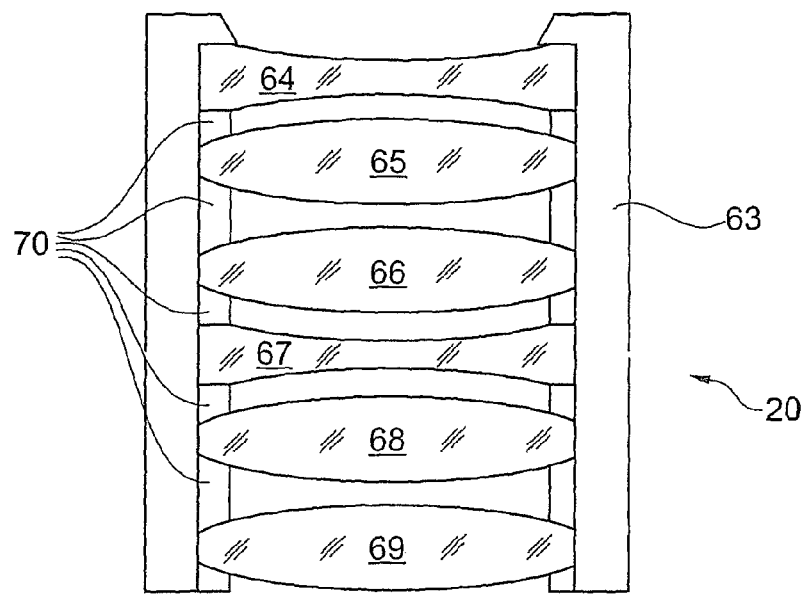
FIG. 6 shows a schematic cross-sectional view of a lens objective.

With respect to FIG. 6, the lens objective 20 comprises a lens barrel 63 and one or more lenses 64 to 69 held inside the lens barrel 63 and spaced from each other using ring shaped spacers 70. Each of the lenses 64 to 69 can have a spherical or an aspherical shape. The lens barrel 63 and the spacers 70 are preferably made of metal, in particular brass. The design of the lens objective 20 such that $\Delta d_2/\Delta T$ is positive, and preferably such that $h_H \cdot C_H = \Delta d_2/\Delta T$ over the temperature range occurring in the operation of the camera module 12, can be achieved by different measures. In particular, the lens objective 20 may comprise lenses 64 to 69 made of different materials, for example glass and plastics. In the embodiment of FIG. 6, for example, the lenses 65 and 69 may be made of plastics and the other lenses 64, 66, 68 may be made of glass. Furthermore, the lenses 64 to 69 may comprise positive lenses 65, 66, 68, 69 and negative lenses 64, 67. Also, the dimensions and arrangement of the lenses 64 to 69 and the lens spacers 70 can be varied and specifically designed. For example, some lenses may be in touch condition without the use of lens spacers 70.

The outer shape of the lens barrel 63 or the lens objective 20 is generally cylindrical and closely fits the inner cylindrical shape of the tubular part 54 or the lens holder 53 such that the lens objective 20 is closely guided in the lens holder 53. In particular, the gap between lens objective 20 and the lens holder 53 is small compared to the wall thickness of the tubular part 54 over the whole length of the tubular part 54.

Figure 7:
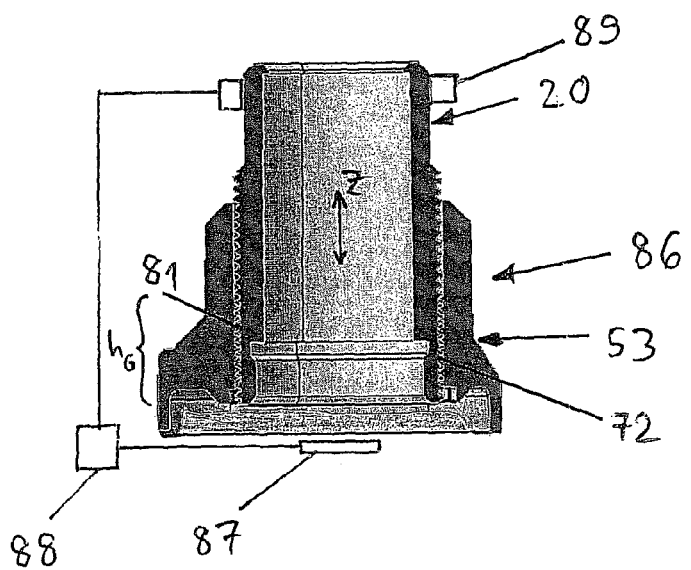
FIG. 7 illustrates a pre-mounting procedure of a lens holder unit.

A pre-focusing procedure of mounting the lens objective 20 into the lens holder 53 is explained in the following with reference to FIG. 7.

In this pre-focusing procedure a lens holder unit 86 is mounted by connecting the lens objective 20 to the lens holder 53. This pre-focusing procedure can for example be done at the manufacturer of the lens assembly 20. Here, the glue 81 is applied to the lens holder 53, in particular in the region of the thread 58, or to the lens objective 20, in particular in the lower region of the thread 72, in a region $h_G$ corresponding to the height of the glue 81 in the final camera unit 12. Then the lens objective 20 is screwed into the lens holder 86 to a position roughly corresponding to its final position in the lens holder 86.

A pre-mounting image sensor 87, which does not have to be identical to the final image sensor 24, is placed at a set position relative to the lens holder 53 corresponding to position of the image sensor 24 in the final camera module 12. The pre-mounting image sensor 87 is connected to a signal processor 88 which may for example be realized in a computer. A manipulator 89 is controllable by the signal processor 88, or manually adjustable, to adjust the position of the lens objective 20 relative to the position of the lens holder 53 in the z-direction, here by rotating the lens objective 20 around its optical axis in order to screw the lens objective 20 into or out of the lens holder 53. Preferably the process is done manually, where an operator is rotating the lens until, for example, a quality metric, representative of image sharpness, is optimized.

An active pre-focusing adjustment of the relative position of the lens objective 20 and the lens holder 53 in the z-direction is applied by continuously taking reference images of a reference object not shown in FIG. 10 by the pre-mounting image sensor 87 while shifting or moving the lens objective 20 and the lens holder 53 relative to each other along the optical z-axis by the manipulator. In every relative position of the lens objective 20 and the lens holder 53 the image quality is evaluated by the signal processor 88 and the evaluated image quality is used as feedback for controlling the manipulator 89 in order to adjust the lens objective 20. When the image quality determined by the pre-mounting image sensor 87 has become optimal, the glue 81 is hardened in particular by thermal curing (while the lens objective 20 and the lens holder 53 are held in the optimal relative position by friction). When the glue 81 is hardened, the pre-mounted lens holder unit 86 can for example be shipped to the supplier of the vision system 10. The above-described pre-focusing procedure leads to advantageously minimize the spread of the thickness of the glue joint 80.

Alternatively to the above described pre-focusing procedure, a stop element may be provided between the lens objective 20 and the lens holder 53 which limits movement of the lens objective 20 relative to the lens holder 53 along the z-direction in a well-defined position.

The camera module 12 is finally mounted for example by the supplier of the vision system 10 by connecting a mounted back plate unit comprising the back plate 32, the sensor 24 and the printed circuit board 83 to the mounted lens holder unit 86 by the UV-curable glue 80.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A camera module for a motor vehicle, comprising:
a lens objective,
a lens holder, to which the lens objective is mounted, the lens holder holding the lens objective, in which a plurality of lenses are spaced from one another by at least one metal spacer ring between adjacent ones of the plurality of lenses, and
a back plate disposed below the lens holder and fixedly connected to the lens holder and holding an image sensor in or close to an image plane of the lens objective,
wherein the lens holder holds the lens objective at a distance from the image sensor and the lens holder is configured such that thermal expansion and contraction of the lens holder changes the distance between the lens objective and the image plane, wherein the distance increases with increasing temperature over an operating temperature range of the camera module,
wherein an outer thread of the lens objective is screwed into an inner thread of the lens holder and glue is disposed between the outer thread and the inner thread in a bottom half of the outer thread.

2. The camera module as claimed in claim 1, wherein the lens objective is configured to keep the image plane in or close to the sensitive plane of the image sensor.

3. The camera module as claimed in claim 1, wherein the lens objective is configured such that $\Delta d_2/\Delta T = h_H \cdot C_H$, wherein $\Delta d_2/\Delta T$ is the change of the distance $d_2$ between the lens objective and the image plane with temperature caused by changes of and within the lens objective, and $C_H$ and $h_H$ are the thermal expansion coefficient and the free height of the lens holder, respectively.

4. The camera module as claimed in claim 1, wherein the lens objective comprises lenses made of different materials.

5. The camera module as claimed in claim 1, wherein the lens objective comprises positive lenses and negative lenses.

6. The camera module as claimed in claim 1, wherein the lens objective comprises a lens barrel made of metal.

7. The camera module as claimed in claim 1, wherein the spacer rings are made of brass.

8. The camera module as claimed in claim 1, wherein the lens objective comprises outer threads and the lens holder comprises co-operating inner threads.

9. The camera module as claimed in claim 1, wherein the lens holder is made of metal.

10. A method of pre-focusing a lens objective in a lens holder for a camera module, the method comprising the steps of:
providing a lens objective, a lens holder and a pre-mounting image sensor,
applying glue to an interface between the lens objective and the lens holder, wherein an outer thread of the lens objective is screwed into an inner thread of the lens holder and the glue is applied to at least one of the inner thread and the outer thread,
positioning the lens objective and the lens holder relative to each other and positioning the pre-mounting image sensor in a set distance to the lens holder,
moving the lens objective and the lens holder relative to each other along an optical z-axis to a final relative position,
hardening the glue while the lens objective and the lens holder are in the final relative position, and
subsequently removing the pre-mounting image sensor from the lens holder.

11. The method according to claim 10, further comprising the step of:
taking a reference image prior to reaching the final relative position,
wherein the final relative position is reached when the image quality determined by the pre-mounting image sensor becomes optimal.

12. The method as claimed in claim 11, wherein the lens objective is configured to keep the image plane in or close to the sensitive plane of the image sensor.

13. The method as claimed in claim 11, wherein the lens objective is configured such that $\Delta d_2/\Delta T = h_H \cdot C_H$, wherein $\Delta d_2/\Delta T$ is the change of the distance $d_2$ between the lens objective and the image plane with temperature caused by changes of and within the lens objective, and $C_H$ and $h_H$ are the thermal expansion coefficient and the free height of the lens holder, respectively.

14. The method according to claim 10, further comprising the step of:
providing a stop element between the lens objective (20) and the lens holder (53) prior to moving the lens objective (20) and the lens holder (53) relative to each other,
wherein the final relative position is reached when the stop element terminates the movement.

15. The method as claimed in claim 14, wherein the lens objective is configured to keep the image plane in or close to the sensitive plane of the image sensor.

16. The method as claimed in claim 14, wherein the lens objective is configured such that $\Delta d_2/\Delta T = h \cdot C_H$, wherein $\Delta d_2/\Delta T$ is the change of the distance $d_2$ between the lens objective and the image plane with temperature caused by changes of and within the lens objective, and $C_H$ and $h_H$ are the thermal expansion coefficient and the free height of the lens holder, respectively.

17. The camera module as claimed in claim 6, wherein the lens barrel is made of brass.

18. A camera module for a motor vehicle, comprising:
a lens objective including lenses made of glass, lenses made of plastics, and brass spacer rings between adjacent ones of the lenses,
a lens holder holding the lens objective, and
a back plate disposed below the lens holder and fixedly connected to the lens holder and holding an image sensor in or close to an image plane of the lens objective,
wherein the lens objective is configured such that the distance between the lens objective and the image plane increases with increasing temperature over an operating temperature range of the camera module,
wherein an outer thread of the lens objective is screwed into an inner thread of the lens holder and glue is disposed between the outer thread and the inner thread in a bottom half of the outer thread.

* * * * *